Sept. 13, 1932.  T. V. BUCKWALTER  1,876,564
ROLLER BEARING CAR WHEEL
Filed July 25, 1930
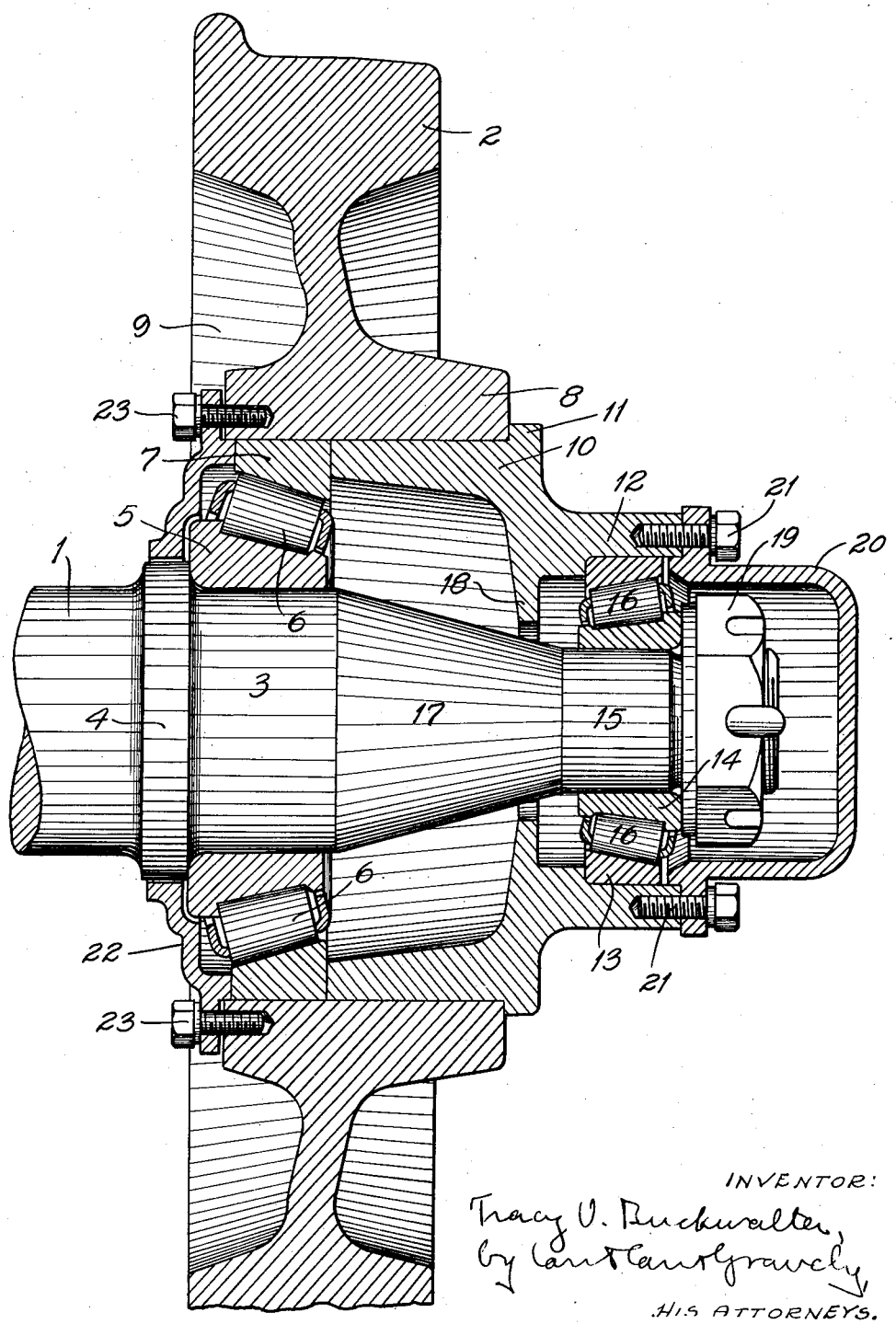
INVENTOR:
Tracy V. Buckwalter,
by Cant Cant Gravely
HIS ATTORNEYS.

Patented Sept. 13, 1932

1,876,564

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER BEARING CAR WHEEL

Application filed July 25, 1930. Serial No. 470,568.

My invention relates to roller bearing car wheels and has for its object a construction that is simple and economical to manufacture and that permits the use of a wheel portion having a relatively small bore. The invention consists principally in the roller bearing car wheel and in the parts, combinations and arrangements of parts hereinafter described and claimed.

The accompanying drawing is a sectional view of a roller bearing car wheel construction embodying my invention.

The end portion of a car axle 1 extends into the bore of a car wheel 2. Mounted on a seat portion 3 of the axle and abutting against a shoulder 4 on the axle is a cone 5 or inner bearing member on which are mounted conical rollers 6. The cup 7 or outer bearing member for said conical bearing rollers is mounted in the bore of the hub portion 8 of the car wheel, the entire bearing being disposed within the planes of the inner and outer surfaces of the wheel rim or tire portion 9. Said bearing is of rather large size and capable of carrying heavy radial load and of withstanding severe end thrust.

Extending into the outer end of the wheel hub 8 and abutting against said outer bearing member 7 is a bearing mounting sleeve 10 that has a shoulder 11 abutting against the outer face of the wheel hub 8. Said sleeve 10 has its outer end portion 12 of considerably smaller size and is counterbored to receive a relatively small bearing cup 13. A bearing cone 14 is mounted on the outer end portion 15 of the axle and conical rollers 16 are interposed between the cup 13 and the cone 14. Said outer end portion 15 of the axle 1 is considerably smaller than the portion 3 on which the first or large bearing cone is mounted, the axle having a tapering portion 17 between the two bearing seat portions. Said sleeve 10 has an inwardly projecting annular flange 18 near the smaller bearing to prevent oil from being drawn from the smaller bearing by the larger bearing.

A locking and adjusting nut 19 is mounted on the threaded outer end of the axle 1 for securing the bearings in position. The end of the sleeve member 10 is closed by a cap 20 that is secured to said sleeve by screws 21. The inner end of the wheel hub 8 is closed by a ring 22 that is secured to the wheel hub by screws 23 and that has a portion encircling the shoulder 4 against which the large bearing cone is mounted.

The above described construction has the advantages of permitting the bore of the wheel to be relatively small without unduly decreasing the size of the axle; of simplifying machining operations and decreasing their cost; by having one bearing cup mounted directly in the bore of the wheel; and of permitting the small outer bearing to be carried considerably beyond the outer face of the wheel and hub, said outer bearing acting as a steadying member while the larger bearing carries most of the load.

What I claim is:

1. A roller bearing car wheel construction comprising a car wheel having a bore therethrough, an axle extending into said bore, a conical roller bearing interposed directly between the axle and the bore of said wheel, a bearing mounting sleeve mounted in the outer end of said bore and engaging the outer bearing member of said bearing and a conical roller bearing interposed between the outer end portion of said axle and the end portion of said bearing mounting sleeve.

2. A roller bearing car wheel construction comprising a car wheel having a bore therethrough, an axle extending into said bore, a conical roller bearing interposed directly between the axle and the bore of said wheel, a bearing mounting sleeve mounted in the outer end of said bore and engaging the outer bearing member of said bearing and having a shoulder engaging the face of said wheel and a conical roller bearing interposed between the outer end portion of said axle and the end portion of said bearing mounting sleeve.

3. A roller bearing car wheel construction comprising a car wheel having a bore therethrough, an axle extending into said bore and beyond the outer face of the wheel, a conical roller bearing interposed directly between the axle and the bore of said wheel, a bearing mounting sleeve mounted in the outer end of said bore and engaging the outer bearing member of said bearing and a conical roller bearing interposed between the outer end of said axle and the end portion of said bearing mounting sleeve.

4. A roller bearing car wheel construction comprising a car wheel having a bore therethrough an axle extending into said bore and beyond the outer face of the wheel, a relatively large conical roller bearing interposed directly between the axle and the bore of said wheel, a bearing mounting sleeve mounted in the outer end of said bore and engaging the outer bearing member of said bearing, the outer end portion of said sleeve being reduced in size and a relatively small conical roller bearing interposed between the outer end of said axle and the end portion of said bearing mounting sleeve.

5. A roller bearing car wheel construction comprising a car wheel having a bore therethrough, an axle extending into said bore and beyond the outer face of the wheel, a conical roller bearing interposed directly between the axle and the bore of said wheel, said axle having a shoulder thereon forming an abutment for said bearing, a bearing mounting sleeve mounted in the outer end of said bore and engaging the outer bearing member of said bearing and having a shoulder abutting against the face of said wheel and a conical roller bearing interposed between the outer end portion of said axle and the end portion of said bearing mounting sleeve.

6. A roller bearing car wheel construction comprising a car wheel having a bore therethrough, an axle extending into said bore and beyond the outer face of the wheel, a conical roller bearing interposed directly between the axle and the bore of said wheel, said axle having a shoulder thereon forming an abutment for said bearing, a bearing mounting sleeve mounted in the outer end of said bore and engaging the outer bearing member of said bearing and having a shoulder abutting against the face of said wheel and a conical roller bearing interposed between the outer end portion of said axle and the end portion of said bearing mounting sleeve, said axle tapering between said bearings.

Signed at Canton, Ohio, this 21 day of July, 1930.

TRACY V. BUCKWALTER.